United States Patent [19]

Asmundsson

[11] Patent Number: 4,594,892

[45] Date of Patent: Jun. 17, 1986

[54] CAPACITANCE PROBE FOR LIQUID LEVEL MEASURING SYSTEM

[75] Inventor: Einar Asmundsson, Middle Haddam, Conn.

[73] Assignee: Veeder Industries Inc., Hartford, Conn.

[21] Appl. No.: 742,460

[22] Filed: Jun. 7, 1985

[51] Int. Cl.[4] .............................................. G01F 23/26
[52] U.S. Cl. .................. 73/304 C; 210/416.4;
340/620; 73/290 R
[58] Field of Search ............ 73/304 C, 304 R, 290 R;
116/227; 422/101; 210/416.4, 463, 340, 341,
243; 324/61 P, 65 P; 340/620, 618; 200/61.05;
361/284

[56] References Cited

U.S. PATENT DOCUMENTS

| 827,318 | 7/1906 | Martin | 73/302 |
|---|---|---|---|
| 2,377,275 | 5/1945 | Smith | 73/304 C |
| 3,550,776 | 12/1970 | Hamilton | 210/416.4 |
| 3,931,011 | 1/1976 | Richards et al. | 210/341 |
| 4,349,882 | 9/1982 | Asmundsson et al. | 364/509 |
| 4,467,646 | 8/1984 | Berryman et al. | 73/304 C |

*Primary Examiner*—Charles Frankfort
*Assistant Examiner*—Thomas B. Will

*Attorney, Agent, or Firm*—Prutzman, Kalb, Chilton & Alix

[57] ABSTRACT

A liquid level measurement capacitance probe is disclosed comprising an elongated outer capacitor tube, an elongated inner tube coaxially mounted within the outer capacitor tube to form a capacitor annulus therebetween with the inner tube having a plurality of longitudinally extending capacitor elements cooperating with the outer capacitor tube to form a plurality of individual capacitor units, a connector unit for electrically connecting the capacitor units to an electronic circuit processor for measuring capacitance values of the capacitor units in calculating a fluid level, a filter for separating water from fuel flowing from the storage tank to be measured to the capacitor annulus, the filter having an annular housing mounted about the outer capacitor tube with an inlet port adapted for fluid communication with the storage tank, an outlet port connected to the capacitor annulus between the inner and outer capacitor tube for delivery of filtered fuel to the annulus, a water discharge outlet for discharging water from the filtered fuel, and a regulator for regulating the discharge of water through the discharge outlet into the storage tank to be measured, and a lower support housing mounted to the lower ends of the inner and outer capacitor tubes to support the lower ends of the capacitor tubes in coaxial spaced disposition.

18 Claims, 5 Drawing Figures

CAPACITANCE PROBE FOR LIQUID LEVEL MEASURING SYSTEM

BACKGROUND AND SUMMARY OF THE INVENTION

The present invention relates generally to liquid level measuring systems for fuel storage tanks and more particularly to a new and improved capacitance probe and filter assembly for such a system.

In liquid level measuring systems such as the type disclosed in commonly assigned U.S. Pat. No. 4,349,882 to Asmundsson et al, the height of fuel in an underground tank is measured for accounting and/or leak detection purposes utilizing a capacitance probe. In Asmundsson et al, a multi-segment capacitance probe is utilized in combination with a microcomputer for repeatedly periodically measuring the capacitance of each segment of the probe and calculating the level and volume of fuel in the tank using capacitance and volume calibration constants automatically updated by the computer from the measured capacitance data and from fuel delivery data automatically fed to the microcomputer.

The presence of water intermixed in the fuel in the capacitance probe varies the capacitance characteristics of the fuel depending upon the amount of water and thereby affects the accuracy of the level measurement as calculated from the capacitance measurements. Generally, the presence of water in the fuel will increase the capacitance measurement primarily due to the conductivity of water and its effective reduction of the dielectric gap of the capacitor. Additionally, the presence of water in the fuel facilitates microbal growth and reproduction which may also vary the capacitance value of the fuel.

Accordingly, it is a primary object of the present invention to provide a new and improved capacitance probe for high accuracy liquid level measurements.

It is a further object of the invention to provide a capacitance probe which significantly reduces the intrusion of water into the capacitor annulus of the capacitance probe.

A still further object of the invention is to provide a new and improved filter assembly for a capacitance probe for removing water from the fuel entering the capacitance probe.

Other objects will be in part obvious and in part pointed out more in detail hereinafter.

DESCRIPTION OF THE PREFERRED EMBODIMENT

Figure 1:
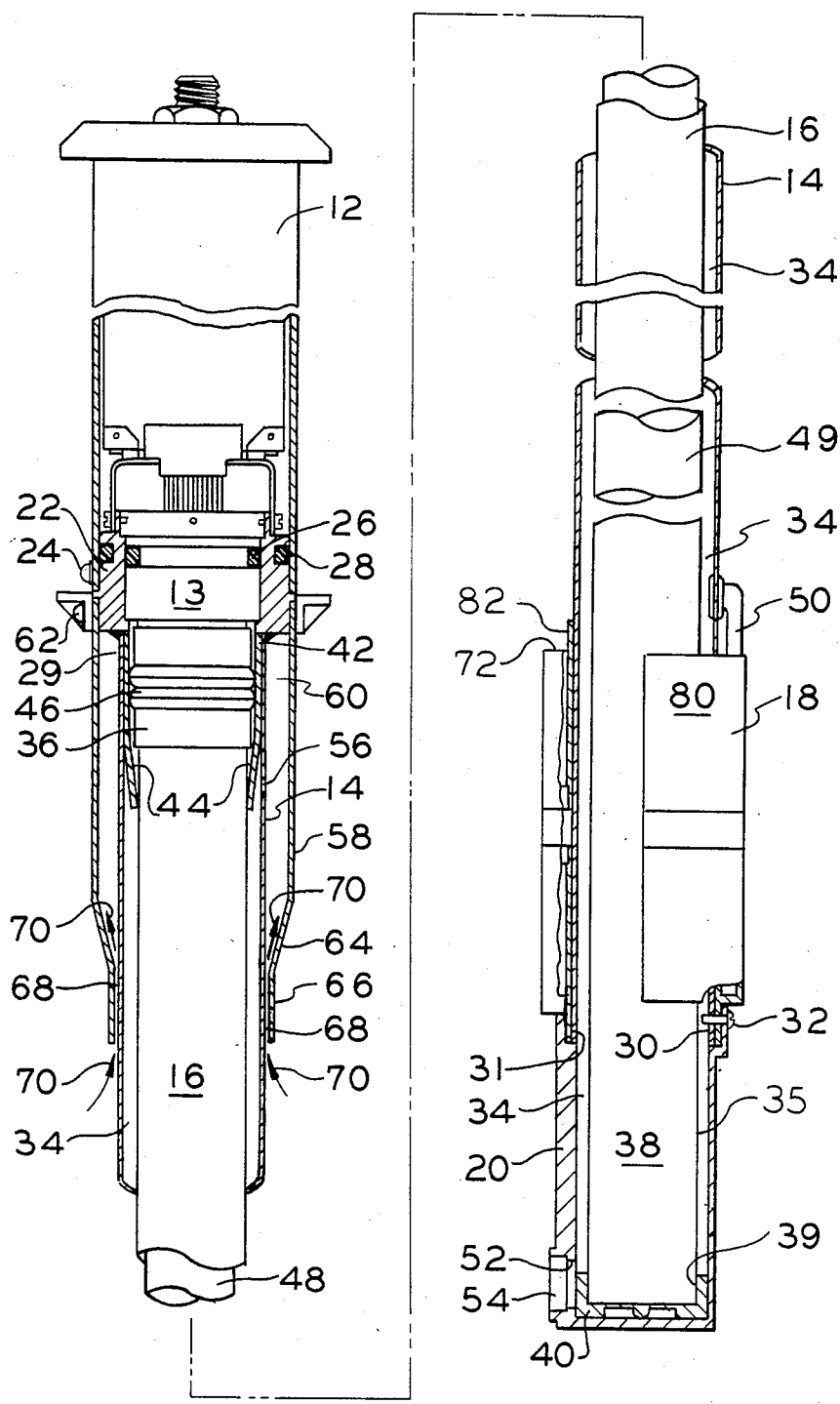
FIG. 1 is a fragmentary longitudinal sectional view, partly broken away and partly in section, of the capacitance probe of the present invention.

Referring to FIG. 1, the capacitance probe of the present invention generally comprises an upper housing 12, a cable group 13, an outer capacitor tube 14, an inner capacitor tube 16, a filter assembly 18, and a lower support housing or boot 20.

An annular support or header 22 is securely mounted by threaded fasteners 24 or the like to the lower end of the housing 12. The cable group 13 is mounted within the header 22 and comprises the wiring to interconnect the capacitor elements to the operating circuit of the probe (not shown) as is more fully described in U.S. Pat. No. 4,349,882 which is incorporated herein by reference. In order to seal the interior of the upper support housing, an O-ring seal 26 is provided between the cable group 13 and the header 22 and an O-ring seal 28 is provided between the header 22 and the lower end of the housing 12.

The outer capacitor tube 14 is securely connected at its upper end 29 to the header 22 by welding or the like. The lower end 30 of the outer capacitor tube 14 is mounted within a reduced bore 31 in the boot 20 and secured thereto by a threaded fastener 32. The inner capacitor tube 16 is coaxially mounted within the outer capacitor tube 14 so as to form a capacitor annulus 34 therebetween. The upper end of the inner capacitor tube 16 is connected to a flexible bellows connector 36 and the lower end 38 is received within the annular recess 39 of the cushion support insert 40 mounted within the bottom of the boot 20. The insert 40 supports the inner capacitor tube 16 and maintains the lower end 38 in coaxial disposition relative to the outer capacitor tube 14. A cylindrical retainer spring 42 having a plurality of axially and radially inwardly extending resilient fingers 44 is mounted between the outer capacitor tube 14 and the bellows 36 so that the fingers 44 engage the inner capacitor tube 16 to maintain the upper end of the inner capacitor tube 16 in coaxial disposition to the outer capacitor tube 14.

The bellows 36 interconnects the upper end of the inner capacitor tube 16 to the cable group 13. The mounting of the upper end of the inner capacitor tube 16 to the bellows 36 forms an airtight seal as does the mounting of the bellows 36 to the cable group 13. Preferably, the retainer spring 42 is configured to provide a clearance fit within the outer capacitor tube 14 until the inner capacitor tube 16 is inserted therein thereby deflecting the fingers outwardly to secure the retainer spring 42 within the outer capacitor tube 14. The resilient fingers 44 function to position the inner capacitor tube coaxial to the outer capacitor tube 14.

The inner capacitor tube 16 comprises an elongated imperforate tempered glass tube 35 sealed at its lower end and an elongated segmented inner capacitor sleeve 48 mounted within the glass tube 35 in engagement therewith. The inner capacitor sleeve 48 consists of nine elongated sleeve segments 49 and intermediate nonconductive sleeve connectors (not shown). As more fully described in U.S. Pat. No. 4,349,882, the internal sleeve segments 49 cooperate with the outer capacitor tube 14 to provide an elongated arrangement of axially extending capacitor segments or units, each having a capacitance dependent upon the level and dielectric of the gas and/or liquid in the capacitor annulus 34 between the outer capacitor tube 14 and the glass tube 35. Except for the bottom capacitor segment, the capacitance of each capacitor segment varies linearly betwen a minimum or "dry" capacitance when there is a gas dielectric in the capacitor annulus 34 (which gas dielectric is primarily fuel vapor) and a maximum or "wet" capacitance provided by a liquid fuel dielectric completely filling the capacitor annulus 34 along the full length of the capacitor segment (and extending above the capacitor segment for example one-half inch or more to overcome any fringe capacitance effect).

As is well known, if the "dry" capacitance and "wet" capacitance are known, the actual height of fuel between the lower and upper ends of a capacitor segment can be calculated from the measured capacitance of the capacitor segment in accordance with a linear relationship of the measured capacitance to the known "dry" and "wet" capacitance values. For that purpose, each of the inner sleeve segments 49 is independently connected to measure the capacitance of the respective capacitor segments and thereby determine the height of fuel within the tank.

The lowest capacitor segment is also employed to measure the level of any water at the bottom of the underground tank. Since the capacitance of the lowest capacitor segment is substantially increased by water in the capacitor annulus 34 (due primarily to the conductivity of water and its effective reduction of the dielectric gap), the height of water can be determined in the same way as the height of fuel using a known minimum capacitance value for the capacitor segment when it is submerged in a fuel dielectric and a known maximum capacitor value when it is submerged in water. In calculating the water level height with the lowest capacitor segment, it is assumed that the lowest segment is submerged in fuel above the level of water where the measured capacitance of the lowest segment is more than the capacitance value of the segment fully submerged in fuel alone.

The outer capacitor tube 14 has a fuel inlet aperture therethrough (not shown) for the receipt of fuel into the capacitor annulus 34. The outlet connector conduit 50 of the filter assembly 18 is connected to the inlet aperture of the outer capacitor tube 14 to deliver fuel filtered by the filter assembly 18 into the capacitor annulus 34. An inlet-outlet port 52 in the lower end of the boot 20 is fluidly interconnected to the bottom portion of the capacitor annulus 34 for the inflow and outflow of water between the bottom of the fuel tank and the bottom portion of the capacitor annulus 34. A sintered ceramic disc filter 54 of 300 micron size pore diameter is mounted within the port 52 to control the flow of water through the port 52. An acceptable filter disc is sold under the trademark Kellundite FAO-160 by the Filtros Division of the Ferro Corporation. The disc filter 52 provides a high impedance flow path relative to the flow path through the filter assembly 18 so that water flows relatively slowly in and out of the lower portion of the capacitor annulus 34.

The upper end of the outer capacitor tube 14 has an air vent passage 56 therethrough for venting the capacitor annulus 34 to passage 56 therethrough for venting the capacitor annulus 34 to facilitate the flow of fuel from the storage tank to be measured into and out of the capacitor annulus 34 in accordance with changes in the liquid level of the storage tank. An elongated enclosure or vapor shield 58 is mounted about the upper end of the outer capacitor tube 14 so as to form a condensation chamber 60 between the vapor shield 58 and the outer capacitor tube 14. The vapor shield 58 is preferably made of aluminium and is rigidly connected to the header 22 by threaded fasteners 62 (only one of which is shown) or the like so that the vapor shield 58 will be in thermal equilibrium with the outer capacitor tube 14. The vapor shield 58 is generally cylindrical at its upper end so as to enclose the upper end of outer capacitor tube 14 and form the chamber 60 adjacent to the vent passage 56. The lower end 64 of the vapor shield 58 extends inwardly towards the outer capacitor tube 14 with a elongated section 66 extending generally parallel to the outer capacitor tube 14 in close proximity thereto so as to form an annular air passageway 68 interconnecting the chamber 60 to the interior of the fuel tank to be measured. In operation, the discharge of fuel from the capacitor annulus 34 due to a reduction in the level of fuel in the storage tank causes air or gas vapor from the fuel tank to pass into the chamber 60 as graphically illustrated by the flow arrows 70 and through the air vent passage 56 into the capacitor annulus 34 thereby venting the capacitor annulus 34. The air passing through the air passageway 68 into the chamber 60 is conditioned by the vapor shield 58 and the outer capacitor tube 14 to facilitate condensation of the moisture within the air on the interior walls of the vapor shield 58 and the outer capacitor tube 14 to reduce or prevent moisture from entering the capacitor annulus 34. Since the vapor shield 58 is in thermal equilibrium with the outer capacitor tube 14 which is relatively cool being at least partially submerged in the fuel of the storage tank, the air passing through the air passageway 68 is conditioned by the relatively cool temperature of the vapor shield 58 and the outer capacitor tube 14 to facilitate condensation within the chamber 60.

The filter assembly 18 includes an elongated annular filter housing 72 mounted coaxially about the outer capacitor tube 14 abutting the upper end of the boot 20. In the illustrated embodiment, the filter housing 72 comprises telescopically interconnecting upper, middle, and lower annular housing sections 74, 76, 78 respectively. For clarity, the filter housing 72 will be generally described in assembly with it being understood that the upper, middle and lower housing sections cooperatively interconnect to form the filter housing 72 as described hereinafter. In assembly, the filter housing 72 has an outer cylindrical wall 80 and an inner cylindrical wall 82 forming an annular filter chamber therebetween. The inner cylindrical wall 82 defines an axial bore 84 which receives the outer capacitor tube 14 for mounting the filter assembly 18 to the probe as shown in FIG. 1.

Figure 3:
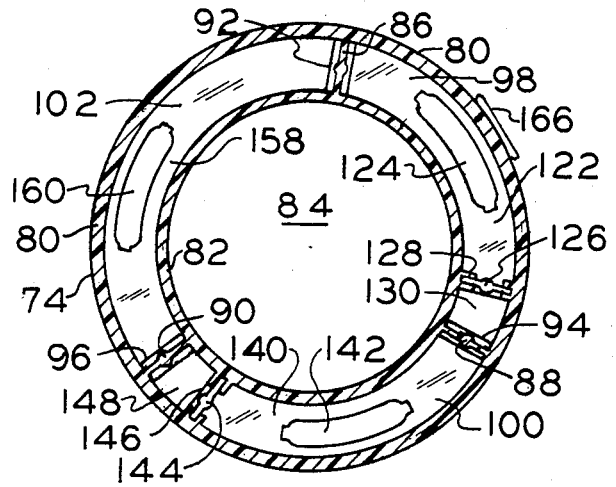
FIG. 3 is a transverse sectional view seen on line 3—3 of FIG. 2.
Figure 4:
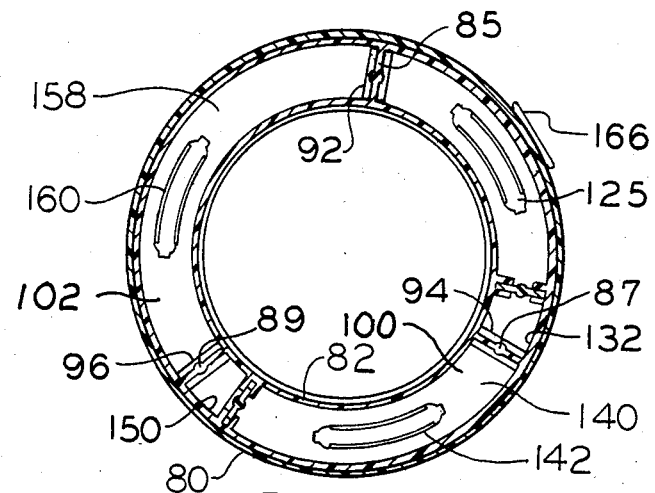
FIG. 4 is a transverse sectional view seen on line 4—4 of FIG. 2.

Referring to FIGS. 3 and 4, the upper housing section 74 has three angularly spaced axially extending walls or partitions 86, 88, 90 between the outer wall 80 and the inner wall 82. Correspondingly, the middle housing section 78 has three partition segments 92, 94, 96 which cooperatively slidably receive the lower ends 85, 87, 89 of the respective partitions 86, 88, 90 so that the upper portion of the filter housing 72 is partitioned into semiannular chambers 98, 100, 102.

Figure 5:
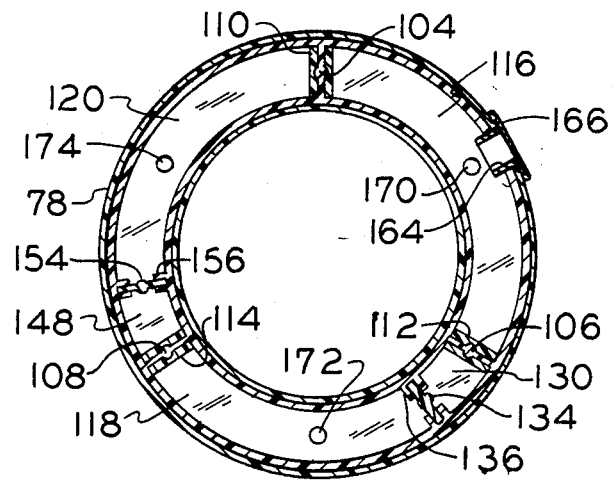
FIG. 5 is a transverse sectional view seen on line 5—5 of FIG. 2.

Similarly, as shown in FIG. 5, the lower housing section 78 has three angularly spaced axially extending walls or partitions 104, 106, 108 between the outer wall 80 and the inner wall 82. The upper ends of the partitions 104, 106, 108 are slidably received within the respective slotted partition segments 110, 112, 114 of the middle housing section 76 to partition the lower portion of the filter housing 72 into semi-annular chambers 116, 118, 120.

Referring again to FIG. 3, the middle housing section 76 has a transverse wall 122 extending between the outer wall 80 and the inner wall 82 so as to separate the lower chamber 116 from the upper chamber 98. The transverse wall 122 has an arcuate oblong aperture therethrough (not shown) for interconnecting the lower chamber 116 to the upper chamber 98 and mounting a filter basket 124 as more particularly described hereinafter.

The top portion of the upper chamber 98 is interconnected to the bottom portion of the lower chamber 118 by a vertical fluid passageway 130. The fluid passageway 130 is formed between the walls 80, 82 by: (a) the partition 88 and a partition 126 extending upwardly from the middle housing section 76, (b) an aligned opening 132 in the middle housing section 76, and (c) the partition 106 and a partition 134 extending downwardly from the middle housing section 76. The partition 126 is slidably mounted within the guide slots 128 of the upper housing section 74 and the partition 134 is slidably mounted with the guide slots 136 of the lower housing section 78. The upwardly extending partition 126 does not extend for the full height of the upper housing section 74 so that an opening is formed over the top of the partition 126 allowing fuel from the top of chamber 98 to flow over the partition 126 into the passageway 130. The downwardly extending partition 134 does not extend to the full depth of the lower housing section 78 so that an opening is formed below the bottom of the partition 134 allowing fuel to flow from the passageway 130 into the bottom of the lower chamber 118.

Similarly, the middle housing section 76 has a transverse wall 140 extending between the outer wall 80 and the inner wall 82 so as to separate the upper chamber 100 from the lower chamber 118. The transverse wall 140 has an arcuate oblong aperture therethrough (not shown) mounting the filter basket 142.

The top portion of the upper chamber 100 is interconnected to the bottom portion of the lower chamber 118 by a vertical fluid passageway 148. The fluid passageway 148 is formed between the walls 80, 82 by: (a) the partition 90 and a partition 144 extending upwardly from the middle housing section 76, (b) an aligned opening 150 in the middle housing section 76, and (c) the partition 108 and a partition 154 extending downwardly from the middle housing section 76. The partition 144 is slidably mounted within the guide slots 146 of the upper housing section 74 and the partition 154 is slidably mounted within the guide slots 156 of the lower housing section 78. The upwardly extending partition 144 does not extend for the full height of the upper housing section 74 so that an opening is formed over the top of the partition 144 allowing fuel to flow over the partition 144 into the passageway 148. The downwardly extending partition 154 does not extend to the full depth of the lower housing section 78 so that an opening is formed below the bottom of the partition 154 allowing fuel to flow from the passageway 148 into the bottom of the lower chamber 120.

The middle housing section 76 has a transverse wall 158 extending between the outer wall 80 and the inner wall 82 so as to separate the upper chamber 102 from lower chamber 120. The transverse wall 158 has an arcuate oblong aperture therethrough (not shown) for mounting the filter basket 160.

The upper housing section 74 has an outlet part 162 at its upper end connected to the upper chamber 102 for the discharge of filtered fuel from the upper chamber 102. The flexible connector conduit 50 is mounted in sealed engagement ith the outlet port 162 to fluidly interconnect the upper chamber 102 to the capacitor annulus 34.

The lower housing section 78 has an inlet port 164 in the outer wall 80 opening into the lower chamber 116.

A filter screen insert 166 is mounted within the inlet port 164 to filter particulate matter from the fuel entering the lower chamber 116 from the storage tank.

The filter baskets 124, 142, 160 each comprise an open-ended basket of non wicking screen material of predetermined size and material adapted to separate water from fuel at a predetermined pressure and prevent the passage of such water through the filter screen. A preferable screen configuration for the head pressure normally encountered in fuel storage tanks would be a 74 micron size screen of fluorocarbon material. As a result of the surface tension between the fluorocarbon material and the water, the water is separated from the fuel and prevented from passing through the screen.

The filter baskets 124, 142, 160 are of arcuate, oblong cross-section and configured for snapfit mounting within the apertures in the middle housing section 76. Since the configuration and mounting of the filter baskets 124, 142, 160 are identical, only one need be described in detail. Specifically, the filter basket 124 is mounted within the oblong aperture of the transverse partition 122 so that its orifice or open end 125 faces downwardly toward the lower chamber 116. Consequently, as fuel passes from the lower chamber 116 upwardly through the filter basket 124 into the upper chamber 98, any water separated from the fuel by the filter screen will collect on the interior of the filter basket and eventually gravitate to the bottom of the lower chamber 116. The bottom annular wall 79 of the lower housing section 78 has a discharge port 168 therethrough interconnecting the lower chamber 116 with the exterior, i.e., the storage tank to be measured. A porous sintered ceramic disc filter 170 of 140 micron size pore diameter is mounted within the discharge port 168 to provide a controlled discharge of water from the bottom of the lower chamber 116 to the storage tank. Similarly, sintered ceramic filters 172, 174 are mounted within like discharge ports in the bottom wall 79 of the lower chambers 118, 120 respectively. An acceptable disc filter is sold under the trademark Kellundite FAO-50 by the Filtros Division of the Ferro Corporation.

Figure 2:
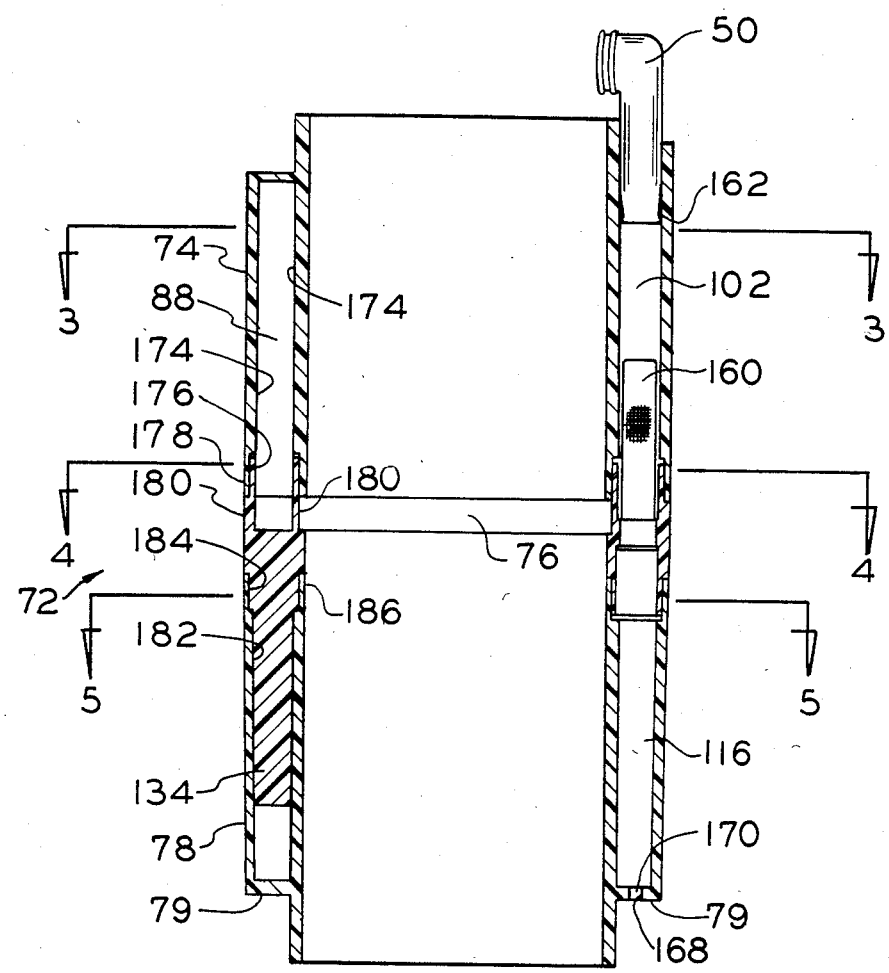
FIG. 2 is a longitudinal sectional view, partly broken away and partly in section, of the filter assembly of the capacitance probe of FIG. 1.

Preferably, the filter housing sections 74, 76, 78 are moulded plastic components configured for telescopic interconnection to form the filter housing as previously described. Referring to FIG. 2, the inwardly facing surfaces 174 of the inner and outer walls of the upper section 74 have a recessed portion 176 adapted to slidably receive and cooperatively adjoin a similar recessed portion 178 in the opposed outwardly facing surfaces 180 of the inner and outer walls of the middle housing section 76 to provide a secure telescopically interconnecting fit between the upper and middle housing sections. Similarly, the inwardly facing surfaces 182 of the inner and outer walls of the lower housing section 78 have a recessed portion 184 adapted to slidably receive and cooperatively adjoin a similar recessed portion 186 in the opposed outwardly facing surfaces of the inner and outer walls of the middle housing section 72 to provide a secure telescopically interconnecting fit between the lower and middle housing sections. As previously described, the respective partitions and partitioned segments of the upper, middle and lower housing sections also slidably interconnect.

In assembly, the filter housing 72 forms three serially interconnected filter chambers for the removal of water from the fuel passing therethrough. Specifically, the lower chamber 116 and the upper chamber 98 form the first or extreme upstream filter chamber of the series.

The lower chamber 118 and the upper chamber 100 form the second or intermediate filter chamber. The lower chamber 120 and the upper chamber 102 form the third or extreme downstream filter chamber of the series. The flow path of the fuel through the filter assembly 18 under the pressure head of the level of fuel in the storage tank is as follows. Fuel from the storage tank enters the lower chamber 116 via the screened inlet port 164. The fuel passes through the lower chamber 116 and the filter basket 124 into the upper chamber 98. As the fuel passes through the filter basket 124, water is removed from this fuel by the filter basket and the removed water gravitates to the bottom of chamber 116 to be controllably discharged through the disc filter 170 to the storage tank. The fuel from the upper chamber 98 flows over the upper edge of the partition 126 into the passageway 130 and downwardly to the bottom of the lower housing section 78. The fuel passes under the partition 134 into the lower chamber 118. From the lower chamber 118, the fuel passes upwardly through the filter basket 142 into the upper chamber 100 with water being removed from such fuel by the filter basket 142 as previously described. The removed water is controllably discharged through the disc filter 172. From the upper chamber 100, the fuel flows over the partition 144 into the passageway 148 and flows downwardly to the bottom of the lower housing section 78. The fuel passes under the partition 154 into the lower chamber 120. From the lower chamber 120, the fuel passes upwardly through the filter basket 160 into the upper chamber 102. Water is removed by the filter basket 160 for controlled discharge through the disc filter 174 to the storage tank. From the upper chamber 102, the fuel flows upwardly through the outlet port 162 and through the connector conduit 50 into the capacitor annulus 34. The water content of the fuel passing into the capacitor annulus 34 is substantially reduced or eliminated by the filter baskets 124, 142, 160 so as to facilitate an accurate capacitance measurement between the inner and outer capacitor tubes.

In operation, the capacitance probe generally extends to the full height of the storage tank to be measured with the lower end of the boot 20 being supported on the bottom of the tank. Fuel from the storage tank flows through the filter assembly 18 for the removal of water therefrom as previously described and fills the capacitor annulus 34 to a height proportional to the level of fuel within the storage tank. As more particularly described in U.S. Pat. No. 4,349,882, the capacitance between the outer capacitor tube 14 and the inner capacitor sleeve segments 49 are repeatedly serially measured to calculate the liquid level of the storage tank. The accuracy of the capacitance measurements are enhanced by the substantial removal or elimination of water from the fuel within the capacitor annulus 34. Additionally, the intrusion of moisture into the capacitor annulus 34 by virtue of venting through the air vent passageway 56 is substantially reduced by the action of the vapor shield 58 as previously described.

As can be seen, a new and improved capacitance probe for high accuracy liquid level measurement is provided which significantly reduces the intrusion of water into the capacitor annulus. Additionally, a new and improved filter assembly is provided for use with a capacitance probe to separate water from the fuel flowing into the capacitance probe.

As will be apparent to persons skilled in the art, various modifications and adaptions of the structures above described will become readily apparent without departure from the spirit and scope of the invention, the scope of which is to be found in the appended claims.

I claim:

1. In a liquid-level-measurement capacitance probe of the type having an elongated capacitor sensor assembly with a capacitor chamber for receiving fuel for measuring capacitance values within said capacitor chamber to calculate fuel level in a storage tank, a filter device for removing water from the fuel flowing into the capacitor chamber comprising:

an elongated annular filter housing forming at least one interior filter chamber and being mounted coaxially about the capacitor sensor assembly, said housing having an axial bore with said capacitor sensor assembly extending through said bore, said filter chamber having an upper end and a lower end vertically below said upper end, an outlet port at said upper end interconnected to said capacitor chamber, an inlet port at said lower end adapted to be in fluid communication with the fuel storage tank to be measured, a filter means located in said filter chamber intermediate said upper and lower ends for separating water from fuel passing through said filter chamber and out said outlet port so that water separated from the fuel gravitates to the lower end of the filter chamber, a water discharge port at the lower end of the chamber, and means for regulating the discharge of water through said water discharge port.

2. The device of claim 1 which comprises:

said filter housing having a plurality of filter chambers, each said filter chamber having an upper end, a lower end vertically below said upper end, an outlet port at said upper end, an inlet port at said lower end, a filter means located in said filter chamber intermediate said upper and lower ends for separating water from fuel passing through said filter chamber and out said outlet port so that water separated from the fuel gravitates to the lower end of the filter chamber, a water discharge port at the lower end of the filter chamber, and means for regulating the discharge of water through said water discharge port, said plurality of filter chambers being interconnected in series with the inlet port of the extreme upstream filter chamber of said series being adapted to be in fluid communication with the fuel storage tank and the outlet port of the extreme downstream filter chamber of said series being connected to said capacitor chamber.

3. The device of claim 2 wherein the outlet port of each of the filter chambers intermediate the extreme upstream and downstream filter chambers is fluidly connected to the inlet port of its adjacent downstream filter chamber.

4. The device of claim 2 wherein said annular filter housing comprises:

an outer cylindrical wall, an inner cylindrical wall coaxial to said outer wall so as to form an annulus between said inner and outer walls, and a plurality of spaced axially extending partitions interconnecting said inner and outer walls to form a plurality of axially extending filter chambers in said annulus.

5. The device of claim 4 wherein each said filter chamber has a transverse partition separating said upper end from said lower end, said transverse partition having an aperture therethrough interconnecting said upper and lower ends with said filter means being mounted adjoining said aperture to filter fluid flowing through said aperture.

6. The device of claim 5 wherein said filter means comprises a filter screen of predetermined size and material adapted to separate water from fuel flowing therethrough at a predetermined pressure and prevent passage of the separated water through said filter screen.

7. The device of claim 5 wherein said aperture is an oblong aperture and said filter means comprises an open-ended filter basket of filter screen of predetermined size and material adapted to separate water fom fuel flowing therethrough at a predetermined pressure and prevent passage of the separated water through said screen, said filter basket having an oblong cross-section adapted for snap-fit mounting of the filter basket in the oblong aperture.

8. The device of claim 2 wherein said chamber filter housing comprises
first, second and third telescopically-interconnecting disengageable annular housing segments configured for press-fit interconnection, and
said second housing segment being disposed between said first and third housing segments and having an annular partition, said annular partition forming a transverse partition section in each of said filter chambers to separate said upper end from said lower end, each said transverse partition section having an aperture therethrough interconnecting said upper and lower ends with said filter means being mounted adjoining said aperture to filter fluid flowing through said aperture.

9. The device of claim 2 where in said means for regulating the discharge of water through said discharge port comprises a sintered filter of predetermined porosity to control the discharge of water from the filter housing.

10. The device of claim 1 wherein said filter means comprises a filter screen of predetermined size and material adapted to separate water from fuel flowing therethrough at a predetermined pressure and prevent passage of the separated water through said screen.

11. A liquid-level-measurement capacitance probe comprising:
an elongated outer capacitor tube having upper and lower ends,
an elongated inner capacitor tube having upper and lower ends and being coaxially mounted within said outer tube in spaced disposition to form a capacitor annulus between said inner and outer tubes, said inner tube having a plurality of longitudinally extending capacitor elements cooperating with said outer capacitor tube to form a plurality of individual capacitor units with each unit providing a separately measurable capacitance value which varies between dry minimum and submerged maximum value thereof,
means for electrically connecting said capacitor units to an electronic circuit processor means for measuring capacitance values of the capacitor units and calculating a fluid level,
filter means for separating water from fuel flowing from the storage tank to be measured to the capacitor annulus, said filter means comprising an annular housing mounted about said outer capacitor tube and having an inlet port adapted for fluid communication with the storage tank to be measured, an outlet port connected to the capacitor annulus between the inner and outer capacitor tubes for the delivery of fuel to said annulus, a filter element for separating water from fuel intermediate said inlet port and said outlet port, a water discharge outlet for discharging water separated from the filtered fuel from said housing, and means for regulating the discharge of water through said discharge outlet, said water discharge outlet being adapted for fluid communication with the storage tank to be measured, and
a lower support housing mounted to the lower ends of said inner and outer capacitor tubes to support the lower ends of said capacitor tubes in coaxial spaced disposition.

12. The device of claim 11 which comprises: means for venting the capacitor annulus to the storage tank
to be measured and means for removing moisture from gas entering the capacitor
annulus through said venting means.

13. The device of claim 12 comprising an enclosure mounted about the upper end of said outer capacitor tube so as to form a condensation chamber, a gas vent passageway through said outer capacitor tube connecting said capacitor annulus and said condensation chamber, and an elongated gas passageway means interconnecting said condensation chamber to the storage tank to be measured for conditioning gas flowing from the storage tank to the gas vent passageway to facilitate condensation of moisture from the gas within said condensation chamber.

14. The device of claim 13 wherein said elongated gas passageway means is interconnected to said outer capacitor tube so as to be substantially in thermal equilibrium with said outer capacitor tube to cool gas passing through said passageway means into said condensation chamber.

15. The device of claim 11 comprising
an elongated metallic vapor sleeve mounted about the upper end of the outer capacitor tube and being configured so as to form a condensation chamber between said sleeve and said outer capacitor tube, said sleeve having upper and lower end portions with said lower end portion extending adjacent to said outer capacitor tube so that said lower end portion and the adjacent portion of said outer capacitor tube form a narrow gas passageway interconnecting said condensation chamber and the storage tank to be measured, said vapor sleeve being interconnected to said outer capacitor tube so as to be substantially in thermal equilibrium with said outer capacitor tube so that gas passing through said passageway is cooled by said vapor sleeve and said outer capacitor tube to facilitate condensation of moisture within said condensation chamber, and
a gas vent passageway through said outer capacitor tube interconnecting said condensation chamber and said capacitor annulus.

16. The device of claim 11 which comprises a cylindrically shaped retainer spring having a plurality of longitudinally disposed, radially inwardly extending resilient fingers, said retainer spring being interposed between said upper end of said outer capacitance tube and said upper end of said inner capacitance tube with said fingers engaging and centering said inner capacitance tube coaxial to said outer capacitance tube.

17. The device of claim 11 wherein said lower support housing has a lower end adapted to be operationally disposed adjacent the bottom of the storage tank to be measured, said lower end having an inlet-outlet port in fluid communication with the lower end of the capacitor annulus port, said port being adapted for fluid communication with the storage tank to be measured.

18. The device of claim 17 wherein said means for controlling flow through said port in said lower support housing comprises a sintered filter of predetermined porosity to provide a high impedance to flow relative to said filter means.

* * * * *